R. C. HARBORD.
GRAIN TESTING DEVICE.
APPLICATION FILED OCT. 3, 1918.
1,310,567.
Patented July 22, 1919.
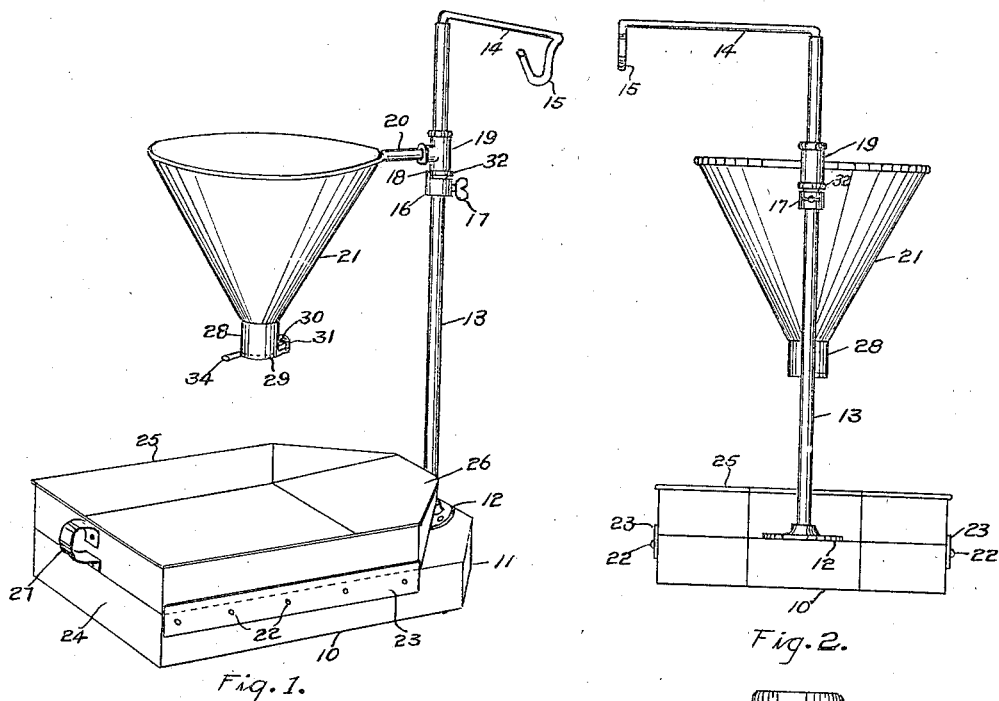
Fig.1.
Fig.2.
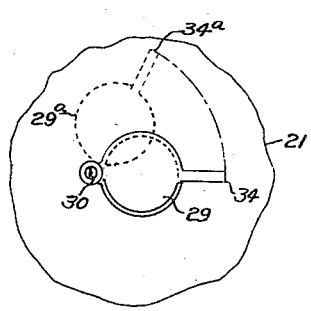
Fig.3.
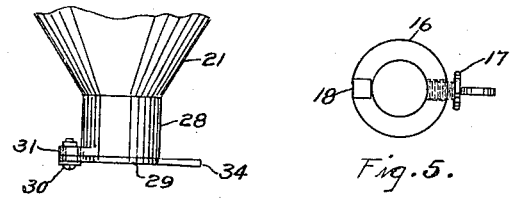
Fig.5.
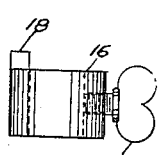
Fig.6.
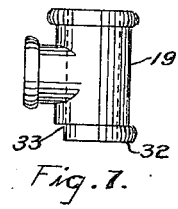
Fig.7.
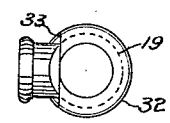
Fig.8.
Fig.4.
INVENTOR.
Rolla C. Harbord
BY
L. L. Westfall ATTORNEY

UNITED STATES PATENT OFFICE.

ROLLA C. HARBORD, OF SPOKANE, WASHINGTON.

GRAIN-TESTING DEVICE.

1,310,567.     Specification of Letters Patent.     Patented July 22, 1919.

Application filed October 3, 1918. Serial No. 256,747.

*To all whom it may concern:*

Be it known that I, ROLLA C. HARBORD, a citizen of the United States of America, residing at Spokane, in the county of Spokane and State of Washington, have invented new and useful Improvements in Grain-Testing Devices, of which the following is a specification.

This invention pertains to grain testers for use by public officials and grain dealers in the testing of the grades and qualities of grain and particularly of wheat. In their testings it is necessary in order to grade the grain to take the weight of specific quantities of grain and also where the quantity contains mixed grains of different varieties, to separate the different varieties in detail and to weigh the different varieties separately. In order to have a uniform test, it is necessary in measuring out the quantity to be tested that the grain to be placed in the measure be poured therein from a uniform height and through a uniform sized opening in order that the pack in the measure may be uniform.

It is the purpose of this invention to so construct the testing device that no mistake can be made in the different steps of the process of testing and that the construction may be simple, inexpensive and durable. In the accompanying drawings forming a part of this specification, Figure 1, is a perspective view of the device without the measure on the scales.

Fig. 2, is a rear view in elevation of the same.

Fig. 3, is a view of the bottom portion (broken-away) of a feed funnel and a gate at the lower end thereof.

Fig. 4, is a bottom view of the same, showing two positions of the gate.

Fig. 5, is a top view of a sleeve to be used on a vertically arranged shaft to adjust the height of an arm that supports the feed funnel.

Fig. 6, is a side view of the same.

Fig. 7, is a side view of a T mounted on a vertically arranged shaft and which supports the feed funnel, and Fig. 8, is a bottom view thereof.

In a detail description, in which like numerals refer to like parts throughout the several views, a rectangular platform 10 with the rear corners cut off as at 11 and having a flat top and bottom, has placed at the rear end thereof a floor bracket 12 in which is vertically mounted a hollow shaft 13. Rotatably mounted in the top of the hollow shaft 13 is a horizontally arranged arm 14 having at the outer end thereof a hook 15 adapted for the support of a pair of balance scales. Loosely engaging the shaft 13 is a sleeve 16 which may be readily moved to the desired position on the shaft 13 and rigidly secured thereto by means of a thumb set-screw 17. Integral with the sleeve 16 and extending upwardly therefrom is a lug 18. Loosely adjusted to the shaft 13 and positioned above the sleeve 16 is a T 19 in which is horizontally mounted an arm 20 serving as a support for a funnel 21. Secured to the sides of the platform 10 as by screws or nails 22 are parallel side boards 23 extending upwardly for a distance above the top surface of the platform 10. Adapted to fit snugly between the side boards 23, to reach to the shaft 13 and to sit flush with the end 24 of the blocks 10 is a pan 25 having a flat bottom, parallel, vertical side walls, one vertical end wall and one end terminating in a spout 26. A handle 27 is secured to the vertical end wall. To the end of the exit spout 28 of the funnel 21 is secured a horizontally adjustable gate 29, the same being secured thereto by means of a bolt 30 connecting the gate with a lug 31 extending outwardly from the spout 28. A portion of the rim 32 of the T 19 is cut out, as at 33, into which the lug 18 extends when the T 19 and the sleeve 16 are in close proximity.

In the practical use of the device, the parts are assembled as shown in Fig. 1, with the funnel adjusted to the proper and standard height above the pan 25. The pan is manually inserted to the position shown in Fig. 1. The funnel 21 is rotated to the position shown in Fig. 1, with the exit spout 28 directly over the center of the pan 25, the end of the slot 33 in the rim 32 of the T 19 striking against the lug 18 on the sleeve 16 serving as a stop and an indication of the funnel being at the right position. The grain to be tested is poured into the funnel 21. The measure (not shown) is placed in the pan 25 directly underneath the exit spout 28 of the funnel 21. The gate 29 is manually swung horizontally by means of the handle 34 to substantially the position shown by the dotted lines 29ª and 34ª and the grain allowed to fill the measure. The measure of grain is then weighed by means of balance scales (not shown) mounted on the hook 15 of the arm 14.

If mixed varieties of grain are found, the measure of grain is poured out into the pan 25, and the different varieties sorted out and separated into the different corners of the pan.

What is claimed is:

A grain testing device comprising a platform, a pan in connection with said platform, a vertically arranged shaft mounted on said platform, a slidable and rotatable member mounted on said shaft, a funnel supported by said slidable and rotatable member adapted for positioning said funnel over the said platform and pan, and a gate in said funnel.

In testimony whereof, I affix my signature in the presence of two witnesses.

ROLLA C. HARBORD.

Witnesses:
J. E. McANDREW,
L. L. WESTFALL.